US007996528B2

(12) United States Patent
Shibata

(10) Patent No.: US 7,996,528 B2
(45) Date of Patent: Aug. 9, 2011

(54) NETWORK MANAGEMENT SYSTEM HAVING AGENT CONTROLLED TRANSMISSION OF STATE VARIATION NOTIFYING COMMAND BASED ON MANAGER LOAD INFORMATION

(75) Inventor: Kazuki Shibata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 99 days.

(21) Appl. No.: 12/632,968

(22) Filed: Dec. 8, 2009

(65) Prior Publication Data
US 2010/0088402 A1 Apr. 8, 2010

Related U.S. Application Data

(63) Continuation of application No. PCT/JP2007/061617, filed on Jun. 8, 2007.

(51) Int. Cl.
G06F 15/173 (2006.01)
(52) U.S. Cl. ......................................... 709/224; 709/223
(58) Field of Classification Search .................. 709/223, 709/224; 714/4, 2; 713/300; 370/252, 476
See application file for complete search history.

(56) References Cited

U.S. PATENT DOCUMENTS

| | | | |
|---|---|---|---|
| 2003/0172147 A1* | 9/2003 | Chang et al. .................. | 709/223 |
| 2004/0205186 A1 | 10/2004 | Gaspard | |
| 2004/0215763 A1* | 10/2004 | Ewing et al. .................. | 709/223 |
| 2005/0086543 A1* | 4/2005 | Manuell et al. ............... | 713/300 |
| 2005/0283638 A1* | 12/2005 | Kato ................................. | 714/2 |
| 2007/0016664 A1* | 1/2007 | Ewing et al. .................. | 709/223 |
| 2007/0116055 A1* | 5/2007 | Atsumi et al. ................ | 370/476 |
| 2009/0300407 A1* | 12/2009 | Kamath et al. ..................... | 714/4 |
| 2010/0131639 A1* | 5/2010 | Narayana et al. ............. | 709/224 |
| 2010/0182920 A1* | 7/2010 | Matsuoka ...................... | 370/252 |
| 2010/0238815 A1* | 9/2010 | Kohout et al. ................ | 370/252 |

FOREIGN PATENT DOCUMENTS

| | | |
|---|---|---|
| JP | 2002-344510 | 11/2002 |
| JP | 2004-80397 | 3/2004 |
| JP | 2004-328726 | 11/2004 |
| JP | 2005-293048 | 10/2005 |
| JP | 2006-185010 | 7/2006 |

OTHER PUBLICATIONS

International Search Report dated Sep. 11, 2007, from the corresponding International Application.

* cited by examiner

*Primary Examiner* — Le Luu
(74) *Attorney, Agent, or Firm* — Katten Muchin Rosenman LLP

(57) ABSTRACT

A manager controlling an agent via a network using SNMP, the manager including a load information generating unit generating manager load information indicating a load status of the manager based on a CPU usage rate indicative of a CPU load status of the manager, a receiving state of a state variation notifying command indicative of the number of receiving state variation notifying commands, transmitted by the agent to notify of a state variation inside a device of the agent, and a load event occurring time indicating a time period before a periodic process is periodically carried out by the manager; and a control command generating unit generating a command to be sent to the agent, whereby the command generating unit generates the control command, to which the manager load information is added, and the agent controls transmission of the state variation notifying command based on the manager load information.

7 Claims, 13 Drawing Sheets

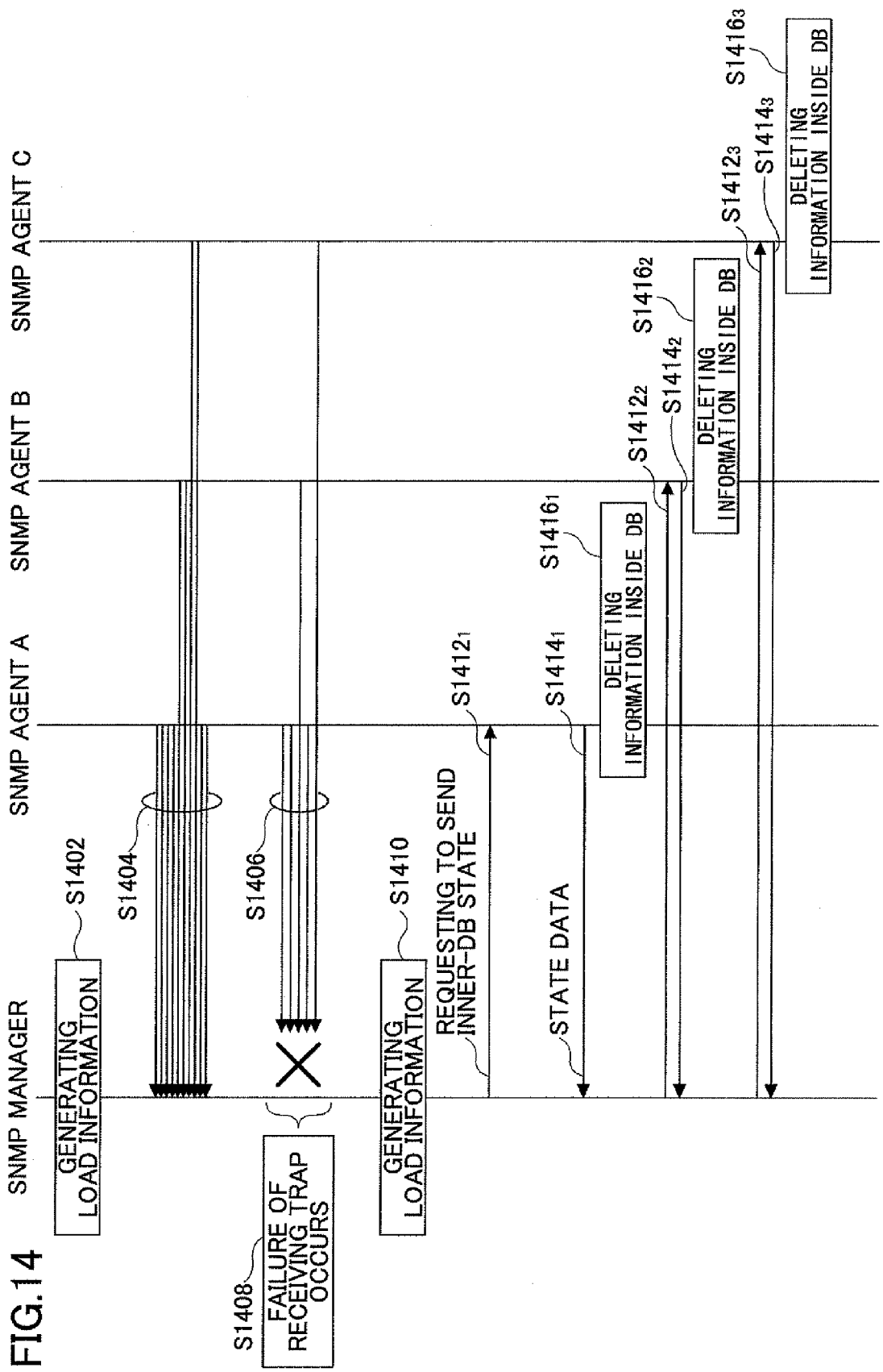

NETWORK MANAGEMENT SYSTEM HAVING AGENT CONTROLLED TRANSMISSION OF STATE VARIATION NOTIFYING COMMAND BASED ON MANAGER LOAD INFORMATION

CROSS-REFERENCE TO RELATED APPLICATIONS

This patent application is based upon and claims the benefit of priority of the International Patent Application No. PCT/JP2007/061617 filed on Jun. 8, 2007, the entire contents of which are incorporated herein by reference.

FIELD

The embodiments discussed herein are related to a manager, an agent, a system, and a transmission control method in the system.

BACKGROUND

A LAN monitor control unit causes a trap processing part to check a likelihood of communication by a LAN in a predetermined cycle. When the LAN communication is enabled, a trap processing part transmits a trap issued at a trap issue section to a manager via the LAN. When the LAN communication is not enabled, the trap issued at the trap issue section is saved in a local buffer until the LAN communication becomes enabled, and as soon as the LAN communication becomes enabled, the trap saved in the local buffer is transmitted to the manager via the LAN to thereby minimize a loss of the trap transmitted from an agent to the manager when the LAN communication is not enabled.

[Patent Document 1] Japanese Laid-open Patent Publication No. 2004-80397

SUMMARY

According to a first aspect of the embodiment, a manager controlling an agent connected to the manager via a network using a simple network management protocol includes a load information generating unit that generates manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager, and a command generating unit that generates a control command to be sent to the agent, wherein the command generating unit generates the control command, to which the manager load information is added, and the agent controls transmission of the state variation notifying command based on the manager load information added to the control command.

According to a second aspect of the embodiment, an agent connected to a manager via a network and controlled by the manager, which sends manager load information indicative of a load status of the manager added to a control command along with the command, the agent includes a load information storing unit that stores the manager load information added to the control command, and a transmission control unit that controls transmission of a state variation notifying command of notifying the manager of a state variation based on the manager load information stored in the load information storing unit when a state of the agent varies.

According to a third aspect of the embodiment, a system includes an agent connected to a network, a manager connected to the network and controlling the agent using a simple network management protocol, wherein the manager includes a load information generating unit that generates manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager, and a command generating unit that generates a control command, to which the manager load information is added, and sends the control command to the agent, and the agent includes a load information storing unit that stores the manager load information added to the control command, and a transmission control unit that controls transmission of the state variation notifying commands based on the manager load information stored in the load information storing unit.

According to a fourth aspect of the embodiment, a transmission control method in a system including an agent connected to a network, a manager connected to the network and controlling the agent using a simple network management protocol, the transmission control method includes generating with the manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager, generating with the manager a control command to which the manager load information is added, sending with the manager the generated control command, receiving with the agent the sent control command, and controlling with the agent to transmit the state variation notifying commands based on the manager load information added to the control command.

The object and advantages of the invention will be realized and attained by means of the elements and combinations particularly pointed out in the appended claims. It is to be understood that both the foregoing general description and the following detailed description are exemplary and explanatory and are not restrictive of the invention, as claimed. Additional objects and advantages of the embodiments will be set forth in part in the description which follows, and in part will be obvious from the description, or may be learned by practice of the invention.

BRIEF DESCRIPTION OF THE DRAWINGS

FIG. 14 is a block diagram illustrating an operation of the system of Embodiment 2.

DESCRIPTION OF EMBODIMENTS

The embodiments discussed herein are related to a manager, an agent, a system, and a transmission control method in a system configured to connect a network device and a control system by a Simple Network Management Protocol (SNMP). In communication on a network, it is required to avoid a loss and a shortage of information and efficiently transmit data. Simple Network Management Protocol (SNMP) attracts attention as a data transmission method having a light communication load.

SNMP is ordinarily known as a standard protocol used to send network control information of an agent to a manager. Communication methods of SNMP can be classified into a response of the agent upon an information acquiring request from the manager and a spontaneous transmission to a manager upon a state variation of the agent.

In SNMP, a two-way communication such as Transmission Control Protocol/Internet Protocol (TCP/IP) is not carried out. Therefore, operations such as a checking of whether transmitted data properly arrive at a destination and a retransmission carried out when the transmitted data do not arrive at the destination are not compensated for.

Therefore, when a response of the agent to the information acquiring request from the manager is carried out, the manager sets a predetermined waiting time with, for example, a timer and plural retry processes are repeated when there is no response from the agent after a lapse of a predetermined waiting time.

Meanwhile, when an agent undergoes a state variation and a trap is spontaneously transmitted from the agent to a manager, because the trap is spontaneously transmitted from the agent, a measure like setup of a predetermined response waiting time with, for example, a timer is unable and the agent is unable to know whether the manager actually receives a trap. Therefore, when the manager is under a high load and a process in the manager is congested, there may occur a problem of a failure of trap receipt.

As described, SNMP has the problem of the failure of trap receipt. There are following measures solving the problem. One of the measures is to provide a reference number (hereinafter, referred to as sequence number), another one of the measures is to make a database (hereinafter, referred to as database) inside an agent and store the data in it, and another one of the measures is a polling method in which the manager periodically acquires information from the agent.

The measure of providing the reference number, the measure of making the database, and the polling method are explained in detail.

Figure 1:
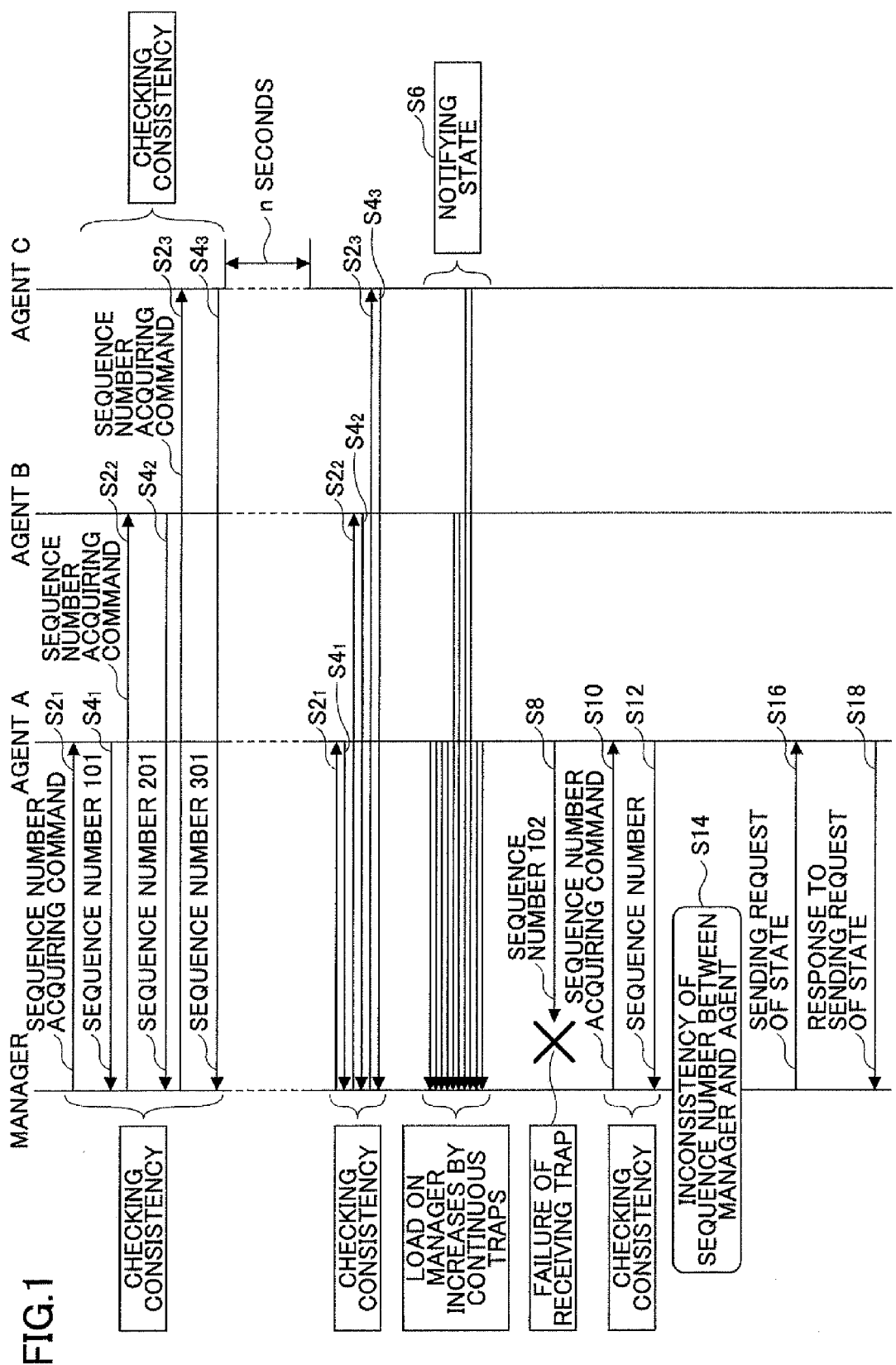
FIG. 1 is a flowchart illustrating a solution to a failure of receiving a trap.

FIG. 1 illustrates the measure of providing the sequence number.

Referring to FIG. 1, a manager is installed in a device controlling a network by SNMP, and agents A, B and C resides in various network devices to be controlled by the manager.

Consistencies of sequence numbers are periodically checked between the manager and the agents. For example, the checking is carried out at every n seconds, where n is a real number more than zero (0) in steps $S2_1$, $S2_2$ and $S2_3$. For example, the manager periodically sends sequence number acquiring commands to the network devices to be controlled. When the agent receives the sequence number acquiring command, the agent notifies the sequence number held by the agent itself to the manager as a response to the sequence number acquiring command in steps $S4_1$, $S4_2$ and $S4_3$. The manager stores the sequence number sent from the agents. FIG. 1 illustrates a case where a sequence number 101 is notified from the agent A, a sequence number 201 is notified from the agent B, and a sequence number 301 is notified from the agent C. The manager stores the sequence number 101 of the agent A, the sequence number 201 of the agent B, and the sequence number 301 of the agent C.

When the agent undergoes a state variation, the sequence number is added to the state and notified to the manager in step S6. For example, a trap packet is transmitted. The manager stores the notified state and the added sequence number. The agents continuously notify the states, and the load on the manager increases. As a result, the manager may fail to receive the traps. For example, the agents notify the manager of state information and a sequence number added to the state information. The manager continuously receives the traps and the load on the manager increases. As a result, the manager fails to receive the traps. For example, when the agent A undergoes a state variation, state information and a sequence number 102 added to the state information is notified to the manager. However, because the load on the manager is already increased, a trap concerning the state information and the sequence number 102 is failed to be received in step S8.

Thereafter, the manager periodically sends sequence number acquiring commands in step S10. When one of the agents receives the sequence number acquiring command, the one of the agents notifies the sequence number held by the one to the manager as a response to the sequence number acquiring command in step S12.

The manager determines whether the sequence number held (stored) by itself is consistent with the sequence number sent by the agent. Here, since the manager failed to receive the trap while the load on the manager increases, there occurs an inconsistency between the sequence number of the manager and the sequence number of the agent in step S14.

When there is the inconsistency between the manager and the agent, the manager sends a command for acquiring the state information failed to be received to the agent. For example, the manager sends a command (state transmission request) for acquiring state information indicative of the state variation corresponding to the sequence number stored by the manager itself in step S16.

When the agent receives the transmission request of the state, the agent notifies the manager of the state information currently occurring in step S18. At this time, the sequence number in the agent is also notified to the manager. In this way, the sequence numbers of the manager and the agents can be consistent with one another.

Referring to FIG. 1, when the manager does not fail to receive the state information and the sequence number 102 added to the state information in step S8, it is determined in step S14 that the sequence number stored in the manager itself is consistent with the sequence number notified (sent) by the agent. Thereafter, the consistency of the sequence numbers is periodically checked.

Figure 2:
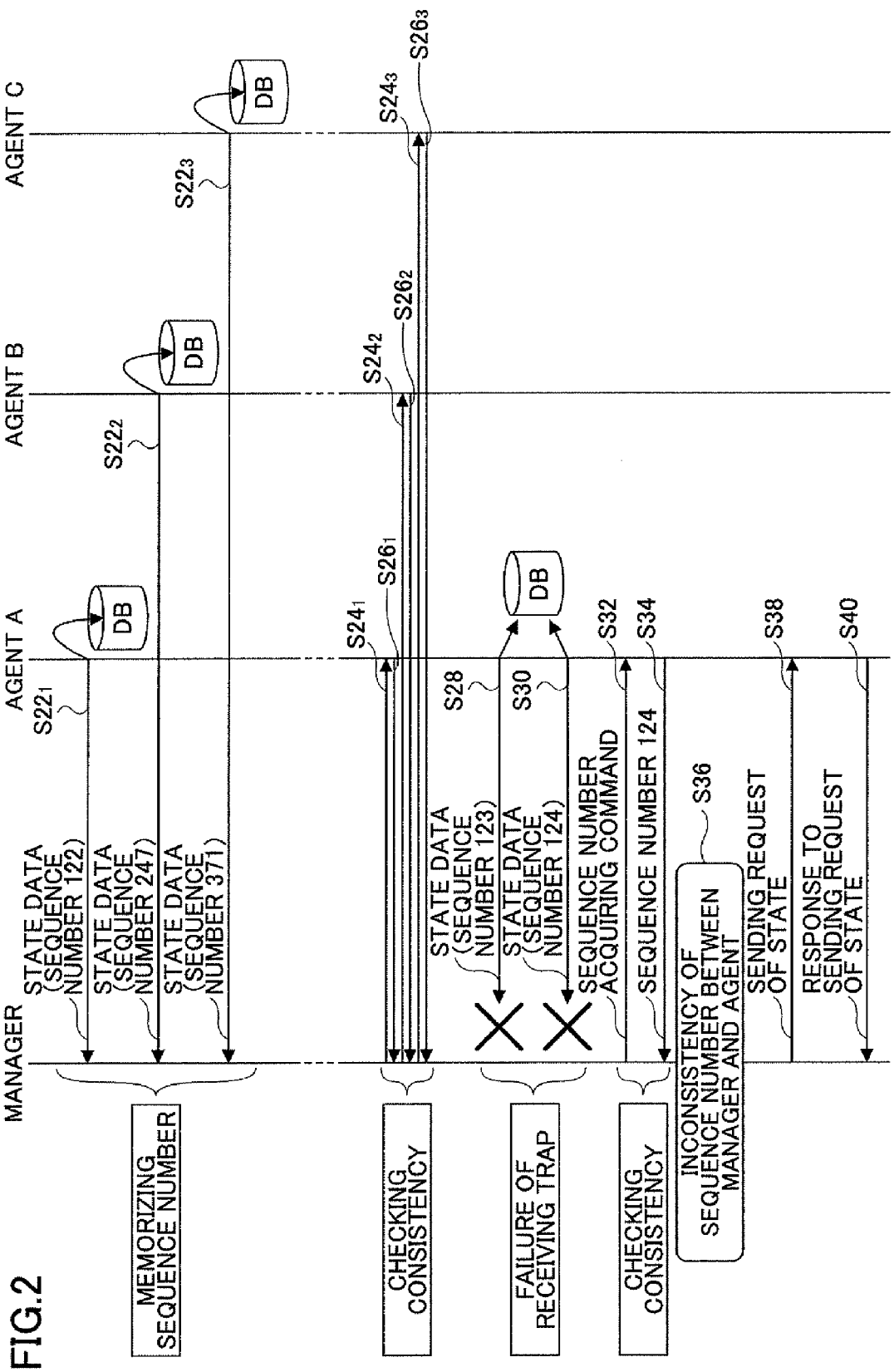
FIG. 2 is a flowchart illustrating a solution to the failure of receiving the trap.

Next, referring to FIG. 2, a method of storing data in a DB is described.

FIG. 2 illustrates a manager which is installed in a device controlling a network by SNMP, and agents A, B and C which reside in various network devices to be controlled by the manager.

When the agents undergo a state variation, the agents store the state information and a sequence number added to the state information in correspondence with the state information in DBs, which are installed in the agents. The agents notify the state information and the sequence number added to the state information in steps $S22_1$, $S22_2$ and $S22_3$. For example, the agent A stores state information indicative of a state variation in correspondence with a sequence number 122, and adds the sequence number 122 to the state information, and transmits the state information to the manager in step $S22_1$. The agent B stores state information indicative of a state variation in correspondence with a sequence number 247, and adds the sequence number 247 to the state information, and notifies the state information to the manager in step $S22_2$. The agent C stores state information indicative of a state variation in correspondence with a sequence number 371, and adds the sequence number 371 to the state information, and notifies the state information to the manager in step $S22_3$.

Consistencies of the sequence numbers are periodically checked between the manager and the agents. The checking is carried out at every n seconds, for example, where n is a real number more than zero (0). For example, the manager periodically sends sequence number acquiring commands to the network devices to be controlled in steps $S24_1$, $S24_2$, and $S24_3$. When the one of the agents receives the sequence number acquiring command, the one of the agents notifies the sequence number held by the one to the manager as a response to the sequence number acquiring command in steps $S26_1$, $S26_2$, and $S26_3$. The manager stores the sequence number sent from the agents.

As described, when the agents undergo a state variation, the agents store the state information and a sequence number added to the state information in correspondence with the state information in DBs, which are installed in the agents. The agents notify the state information and a sequence number added to the state information to the manager. For example, state information indicative of the state variation occurring in the agent A is stored in the agent A in association with the sequence number 123, and the agent A notifies the state information and the sequence number 123 added to the state information to the manager. Further, when the state variation occurs in the agent A, the state information indicative of the state variation occurring in the agent A is stored in the agent A in association with a sequence number 124, and the agent A notifies the state information and the sequence number 124 added to the state information to the manager. However, the manager fails to receive these traps in steps S28 and S30.

Thereafter, the manager sends a sequence number acquiring command for periodically checking consistency of sequence numbers in step S32. When the agent receives the sequence number acquiring command, the agent notifies the sequence number held by the agent to the manager as a response to the sequence number acquiring command in step S34.

The manager determines whether the sequence number held (stored) by itself is consistent with the sequence number sent by the agent. Here, since the manager has failed to receive the trap, there occurs inconsistency of the sequence numbers between the manager and the agent in step S36.

When there is the inconsistency between the manager and the agent, the manager sends a command (sending request of state) for acquiring the state information failed to be received to the agent. For example, the manager sends the command for acquiring state information indicative of the state variation corresponding to the sequence number stored by the manager itself in step S38. At this time, the manager adds the sequence number held by the manager. The sending request of state and the sequence number 122 added to the sending request of state, which are held in the manager, are sent to the agent A in step S40.

When the agent A receives the sending request of state, the agent A extracts state information from the notified sequence number to the sequence number held by the agent A out of the DB, and notifies the state information together with the sequence numbers to the manager. At this time, the agent A extracts the state information corresponding to the sequence numbers 122 through 124 and notifies the state information to the manager.

Figure 3:
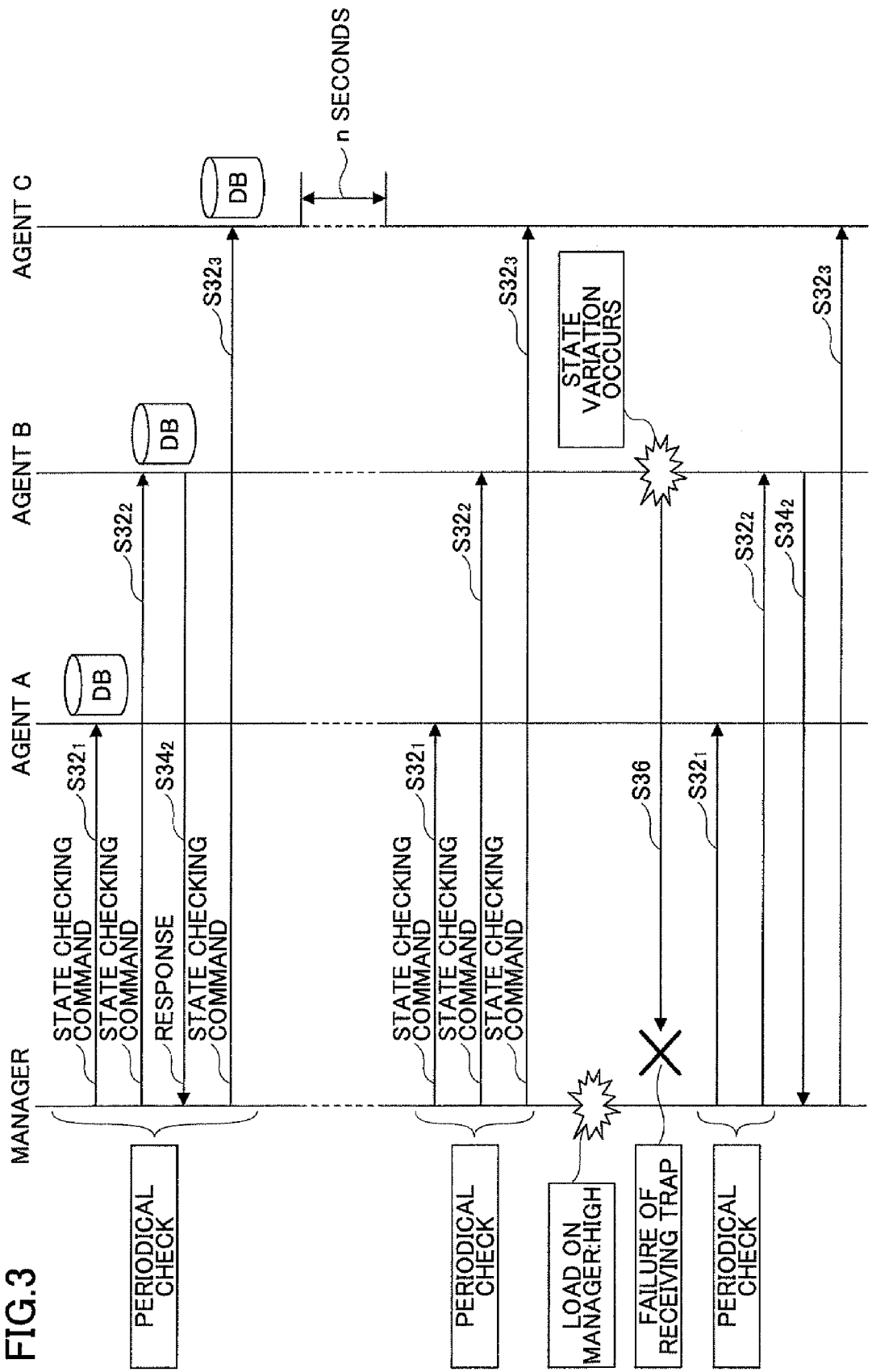
FIG. 3 is a flowchart illustrating a solution to the failure of receiving the trap.

Next, a method of periodically carrying out polling is described in reference to FIG. 3.

FIG. 3 illustrates the manager which is installed in the device controlling the network by SNMP, and the agents A, B and C which reside in the various network devices to be controlled by the manager.

The manager periodically checks a state of the agent. For example, the manger periodically receives a state checking command at every n seconds (n is a real number more than zero), for example, in steps $S32_1$, $S32_2$, $S32_3$.

When the state variation occurs in the agents, the agents store state information in the DB. Further, the agents respond to the state checking command received from the manager when the state variation occurs in step $S34_2$. A scale for detecting the state variation is, for example, a scale used to measure a difference of the DBs. Specifically, the sequence numbers and data numbers of the DBs may be used.

When the manager becomes in a load status of high, there may occur a case where a response to the state checking command which is sent by the agent is failed to be received in step S36. In this case, when the manager checks the state of the agent in a next periodical check, the agent notifies the state information stored in the DB as a response to the state checking command from the manager in step $S34_2$. When the manager checks the state of the agent in the next periodical check, the agent notifies the state information stored in the DB as a response to the state checking command which is received from the manager.

The above-described technique may have the following problems.

There is a problem that when an inconsistency of the sequence numbers is recognized by the manager and the state of the agent already varies, data corresponding to the sequence numbers may not be acquired.

Figure 4:
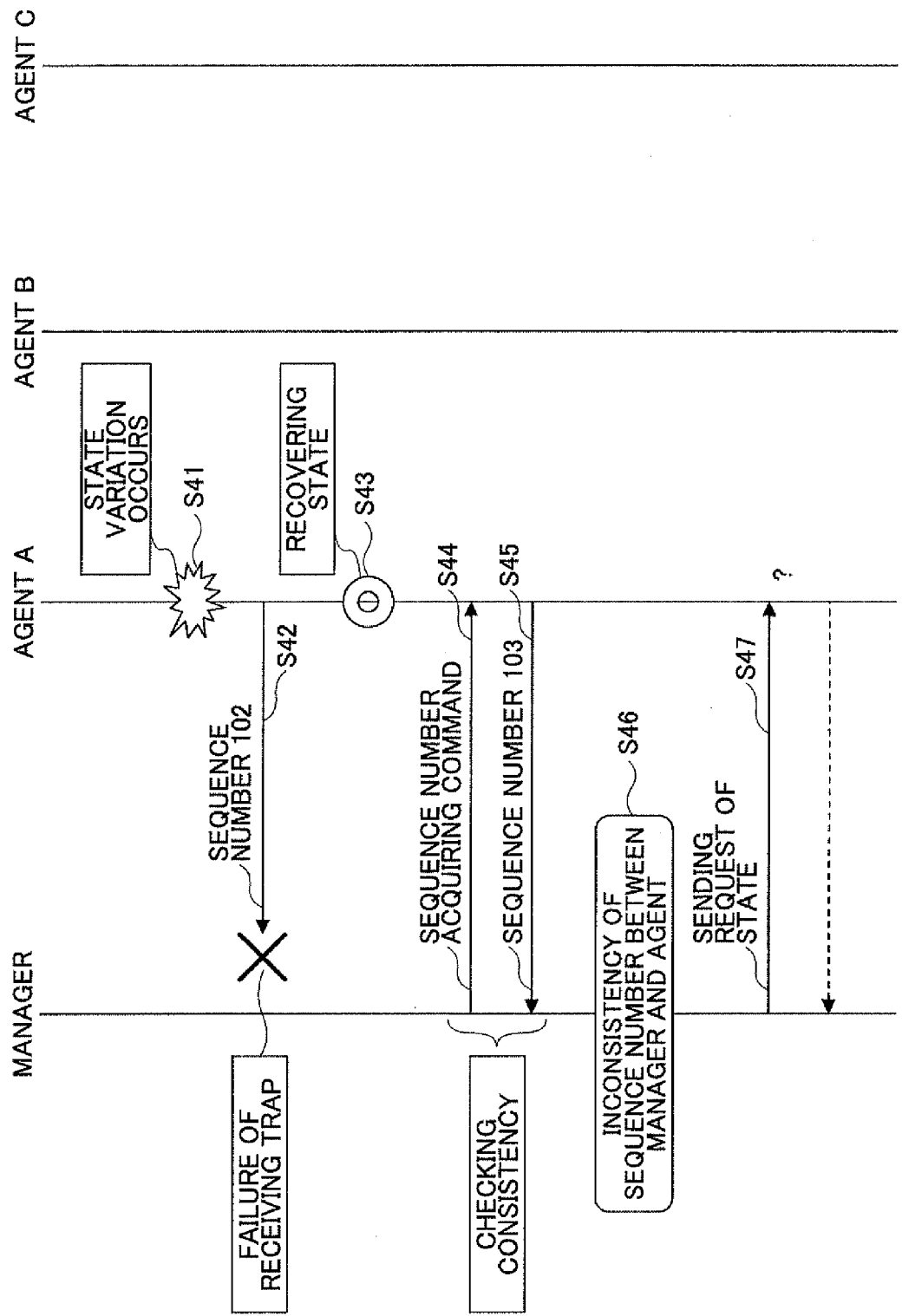
FIG. 4 is a flowchart illustrating a specific matter in the solution to the failure of receiving the trap.

Specifically, as illustrated in FIG. 4, the state variation occurs in the agent A in step S41. Then, the sequence number 102 is added to the state information and the state information and the sequence number are notified to the manager. The manager fails to receive the trap in step S42.

Before the manager sends the sending request of state, a state of the agent A is recovered in step S43. Here, the state of the agent A varies.

Thereafter, the manager sends a sequence number acquiring command for periodically checking consistency of sequence numbers in step S44. When the agent receives the sequence number acquiring command, the agent notifies the sequence number held by the agent itself to the manager as a response to the sequence number acquiring command in step S45.

The manager determines whether the sequence number held (stored) by itself is consistent with the sequence number sent by the agent. Here, since the manager has failed to receive the trap, there occurs inconsistency of the sequence numbers between the manager and the agent in step S46.

When there is the inconsistency between the manager and the agent, the manager sends a command (sending request of state) for acquiring the state information failed to be received to the agent. For example, the manager sends the command for acquiring state information indicative of the state variation corresponding to the sequence number stored by the manager itself in step S47.

The agent A does not know what state variation occurs even though the sending request of state since the state has already been recovered. Therefore, the requested state information may not be notified.

There is a problem that a method of storing data in the DBs of the agents may be carried out with the DBs having a large capacity enough to store the state information indicative of all state variations.

A result of calculating a capacity of the DB may be different depending on a method of using the DB, the number of data to be stored, a storing period or the like. There will occur a load of accumulating process of the state information if the calculation of the capacity is erroneous in designing a system.

Figure 5:
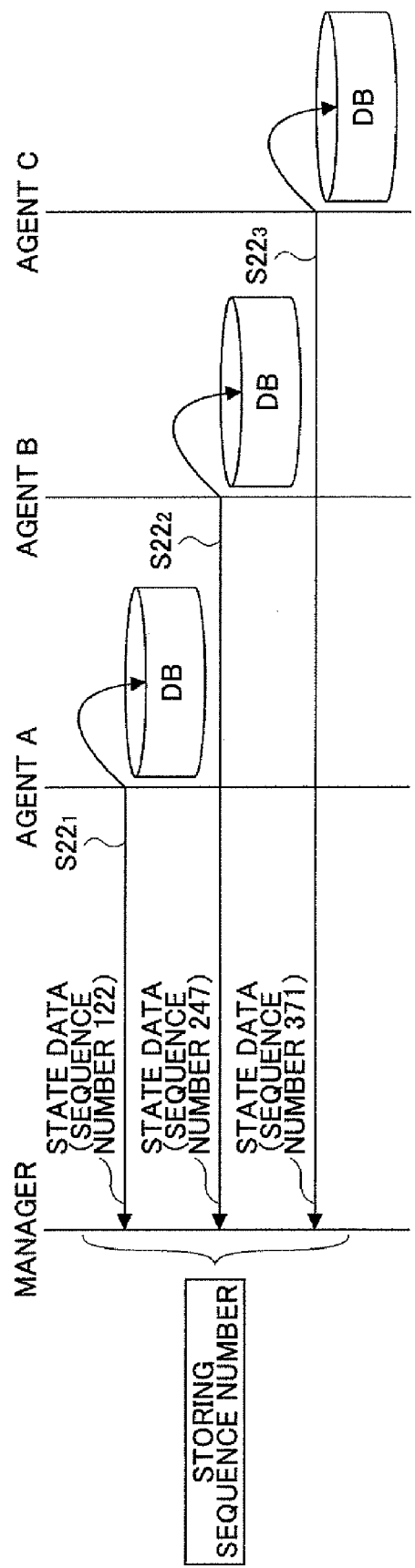
FIG. 5 is a flowchart illustrating the specific matter in the solution to the failure of receiving the trap.

Specifically, when the agents undergo a state variation, the agents store the state information and a sequence number added to the state information in correspondence with the state information in the DBs, which are installed in the agents, as illustrated in FIG. 5. The agents notify the state information and the sequence number added to the state information in steps $S22_1$, $S22_2$ and $S22_3$. For example, the agent A stores state information indicative of a state variation in correspondence with a sequence number 122, and adds the sequence number 122 to the state information, and notifies the state information to the manager in step $S22_1$. The agent B stores state information indicative of a state variation in correspondence with a sequence number 247, and adds the sequence number 247 to the state information, and notifies the state information to the manager in step $S22_2$. The agent C stores state information indicative of a state variation in correspondence with a sequence number 371, and adds the sequence number 371 to the state information, and notifies the state information to the manager in step $S22_3$. Thus, the DBs of the agents preferably have a large capacity enough to store state information indicative of all of the state variations. For example, there may occur a problem in which the DBs are immediately occupied by data without efficiently storing the data. Further, there is a problem in which an extremely long time elapses for searching the data when an information amount is increased.

A method of periodically polling is effective for preventing a failure of trap receipt. However, there is a problem in which a real time notification may not be achieved because the notifications of the state information indicative of the state variation are carried out at a polling cycle. Further, there may occur a problem associated with the polling because the polling is frequently used in combination with a sequence number and storage of DB data.

Figure 6:
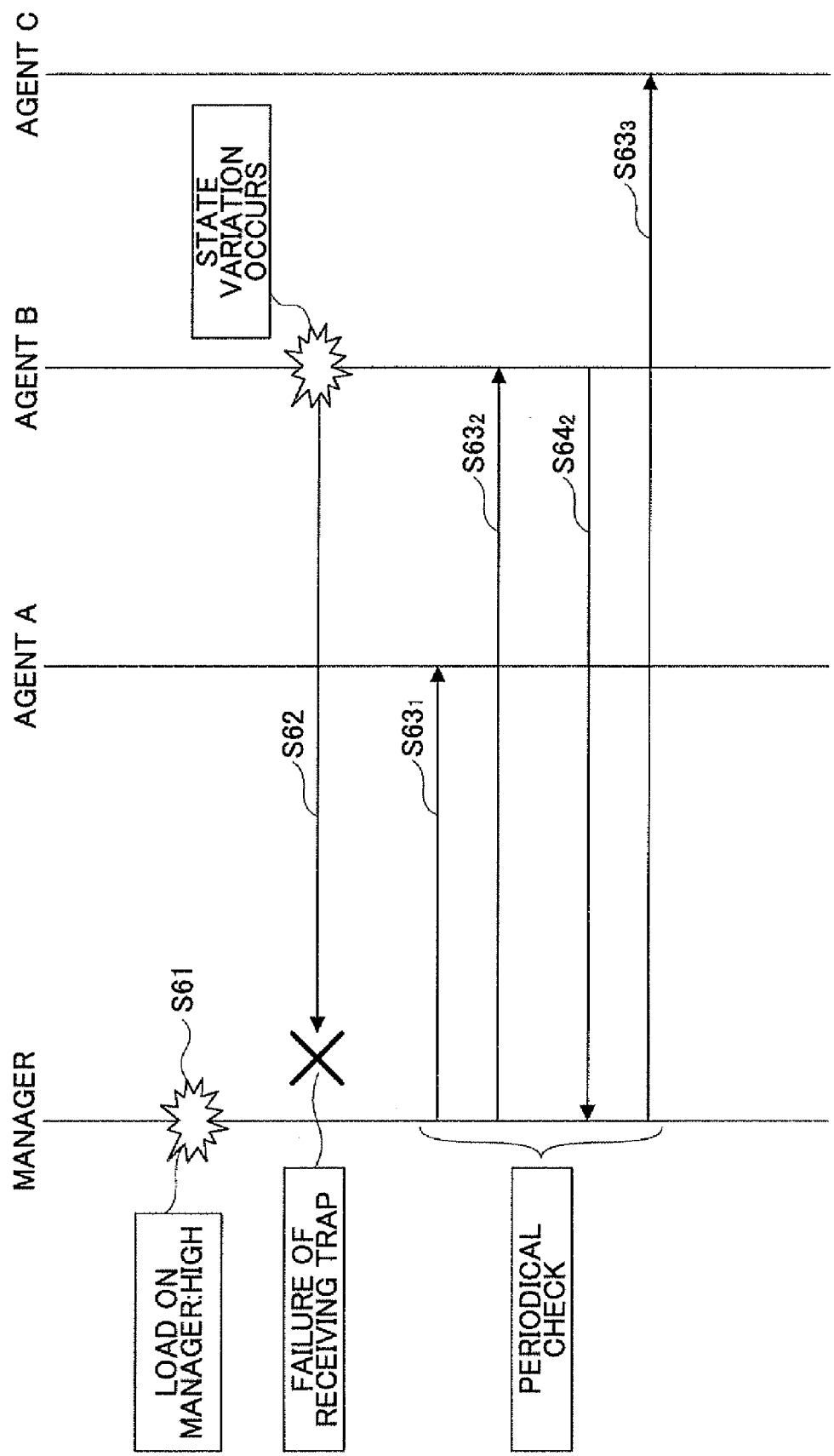
FIG. 6 is a flowchart illustrating the specific matter in the solution to the failure of receiving the trap.

Specifically, as illustrated in FIG. 6, the manager is in a load status of high in step S61. The agent undergoes the state variation and sends the state information. However, the manager fails to receive the state information in step S62. Then, the manager checks the state of the agent in a next periodical check in steps $S63_1$, $S63_2$, and $S63_3$. The agent notifies the state information stored in the DB as a response to the state checking command which is received from the manager in steps $S64_2$. Therefore, when the manager fails to receive state data such as a trap, it is not possible to receive state information indicative of state variation other than the periodical check. Therefore, the manager may not obtain the state information indicative of the state variation in real time.

The technique described in the above does not solve such a failure of trap receipt.

Further, in order to solve a problem in which a trap is failed to be received, when a LAN communication between the manager and the agent is monitored and it is detected that the LAN communication is not established, traps issued after the detection and until establishment of the LAN communication are saved in a local buffer. When the LAN communication is established, the traps which were saved are transmitted to the manager from the agent in, for example, Patent Document 1.

Since the agent is on a side of issuing the traps, the agent ordinarily notifies data to the manager in real time based on a state variation. However, if the trap is transmitted without considering a load on the manager, probability of failing to receive the trap is increased.

In the technique disclosed in the above, the load on the manager may not be considered, a trap is issued at a timing of a state variation, and the manger seems to bring a failure of trap receipt. Therefore, it is an object of Embodiments to transmit a trap with an assured effect while possibly easily developing and introducing another system within a possibly shorter time base on a current system.

It is another object of Embodiments to provide a manager, an agent, a system, and a transmission control method which enables to communicate between the manager and the agent based on a load status of the manager.

It is another object of Embodiments to provide a manager, an agent, a system, and a transmission control method which enables to decrease a failure of trap receipt in the manager based on a load status of the manager.

Preferred embodiments of the present invention will be explained with reference to accompanying drawings.

Through all FIGs., the same numerical references are used for portions having the same functions and repetitive explanations of these portions are omitted.

Embodiment 1

Figure 7:
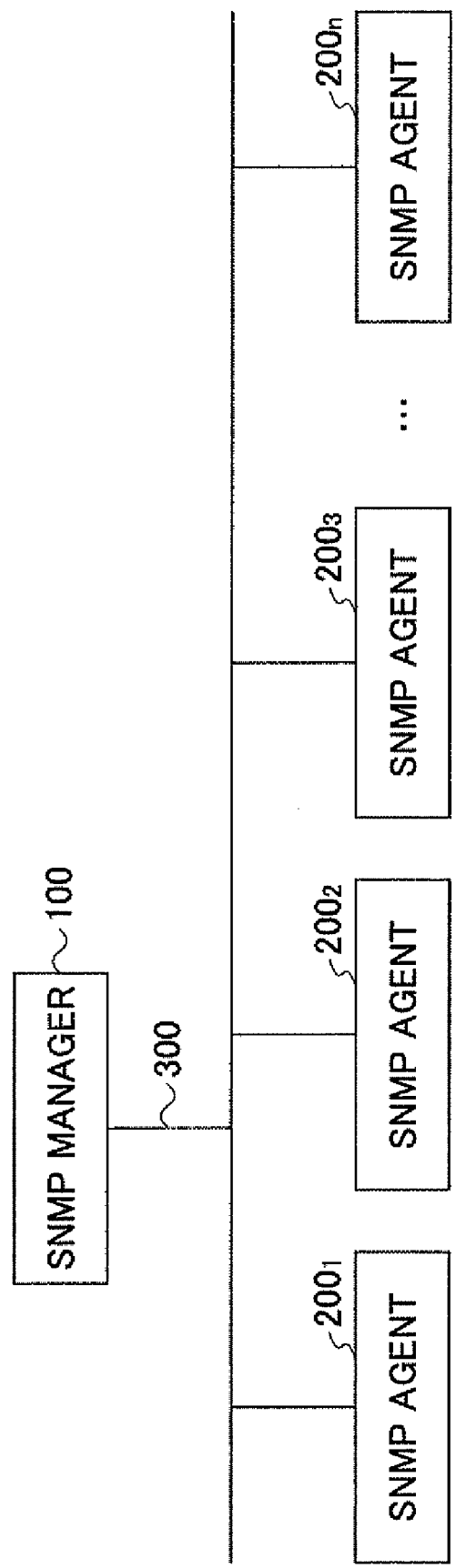
FIG. 7 is a block diagram illustrating an example of a system of Embodiment 1.

Referring to FIG. 7, a structure of a device control system of Embodiment 1, to which an SNMP manager and an SNMP agent are applied, will be described.

An SNMP manager is a software module installed in a device for monitoring using a simple network management protocol (SNMP). An SNMP agent is a software module installed in a device which is monitored using a simple network management protocol (SNMP). Information of devices, in which the SNMP agents are installed, is gathered to the SNMP agents. The information is converted into an SNMP protocol. Then, the converted SNMP protocol is sent to the SNMP manager.

The device control system of Embodiment 1 has one or plural network devices 200 (200$_1$, 200$_2$, 200$_3$, ..., and 200$_n$; where n is an integer more than zero), hereinafter, referred to as SNMP agent, and a management system 100, hereinafter referred to as SNMP manager, whereby the SNMP agent and the SNMP manager are connected using a simple network management protocol (SNMP). The simple network management protocol (SNMP) is a protocol for monitoring and controlling communication devices such as a router, a computer, a terminal, which are connected to a network of a TCP/IP based network. TCP/IP is the abbreviation of Transmission Control Protocol/Internet Protocol.

The SNMP agents 200 are connected to the SNMP manager 100 via a communication path 300 and relevant networks. The SNMP agents 200 issue notify commands for notifying state variations of the SNMP agents based on information of event or error, which occurs in the SNMP agents, e.g. traps, and transmit the notify commands to the SNMP manager 100 via the communication path 300.

The SNMP manager 100 periodically gathers the information from the SNMP agents 200. The SNMP manager 100 has not only a function of gathering the information but also a function of registering a schedule to thereby periodically gather the information from the SNMP agents 200.

The SNMP agent 200 sends a reply when the SNMP agent 200 receives a GET command or a SET command from the SNMP manager 100. Further, the SNMP agent 200 spontaneously issues a command such as a state variation notifying command, for example, a trap, when the SNMP agent 200 detects a state variation inside a network device, in which the SNMP agent itself is installed.

Figure 8:
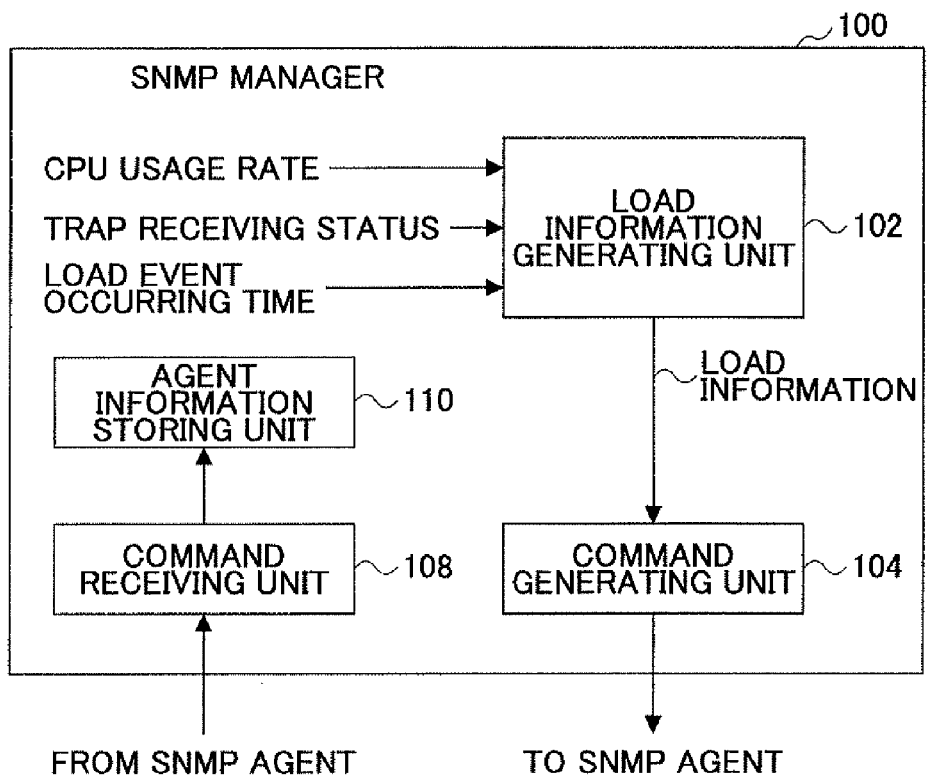
FIG. 8 is a block diagram illustrating an example of an SNMP manager of Embodiment 1.
Figure 9:
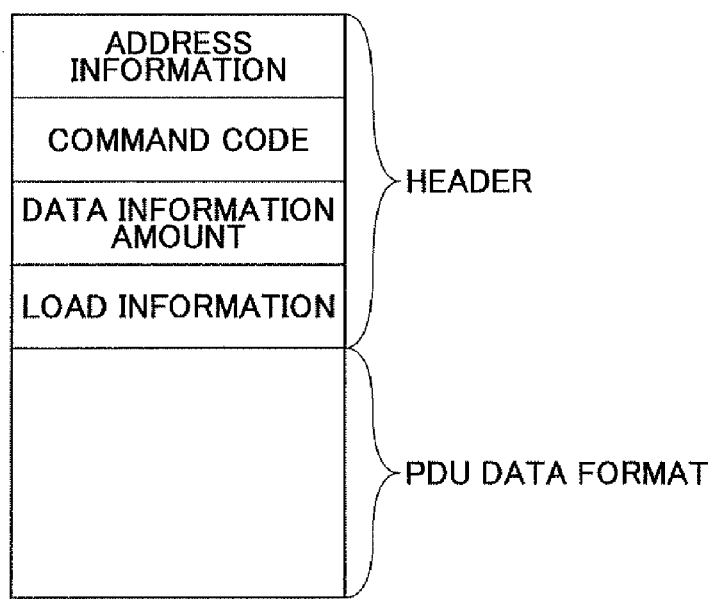
FIG. 9 illustrates a configuration of a command which is sent by the SNMP manager of Embodiment 1.

The SNMP manager 100 of Embodiment 1 is described in reference to FIG. 8.

The SNMP manager 100 includes a load information generating unit 102, a command generating unit 104, a command receiving unit 108, and an agent information storing unit 110.

The load information generating unit 102 receives a CPU usage rate, a trap receiving state, and a load event occurring time, measures a load on the SNMP manager based on the CPU usage rate, the trap receiving state, and the load event occurring time, and generates load information indicative of the load on the SNMP manager.

The CPU usage rate is a value indicating an extent for programs of using a CPU. When the CPU usage rate is high, many tasks are processed, and therefore it takes a long time for processing these many tasks. Therefore, it takes a long time for processing traps, received from the SNMP agent 200, with a program. For this reason, there may occur an event that traps are failed to be received in the course of the processing. A value of the CPU usage rate becomes high or low depending on a running state of a program executed in the SNMP manager 100.

"Trap receiving status" means the received amount (number) of traps, which are transmitted from the SNMP agent and received by the SNMP manager per second. When the state variations or the like frequently occur in the SNMP agent, the SNMP manager receives plural traps as many as the state variations or the like. When the traps, belonging to the state variation notifying commands, are received from only one of the SNMP agents, troubles scarcely occur. However, when the plural traps are received from the plural SNMP agents, the amount (number) of receiving the traps per second increases. Therefore, there may occur an event of failing to receive the traps. The trap receiving state has an effect on the "CPU usage rate", and the "CPU usage rate" increases as the trap receiving state increases.

The "load event occurring time" designates a value after which seconds a periodically carried-out process is carried out next. Inside the networks, working situations of devices are checked, and matching processes and so on are periodically carried out. Schedules of these processes are generally controlled to prevent the network from being in a high load condition, and carried out in a period of time when the other programs are not operated. When there is an accidental state variation, probability causing a failure of trap receipt increases.

The load information generating unit 102 converts various parameters of "CPU usage rate", "trap receiving state", and "load event occurring time", which are input, into load information. For example, the load information generating unit 102 refers to Table 1 and converts the parameters into the load information. Table 1 illustrates plural pieces of the load information classified in relation to values of loads of the parameters of "CPU usage rate", "trap receiving state", and "load event occurring time".

TABLE 1

LOAD INFORMATION CONVERSION TABLE

| CPU USAGE RATE (%) | TRAP RECEIVING STATE (TRAP/sec) | LOAD EVENT OCCURRING TIME (sec) | LOAD INFORMATION |
|---|---|---|---|
| 81 THRU 100 | 20 OR MORE | OCCURRING WITHIN 60 | EXTREMELY HIGH |
| 61 THRU 80 | 16 THRU 19 | OCCURRING WITHIN 61 THRU 120 | HIGH |
| 41 THRU 60 | 12 THRU 15 | OCCURRING WITHIN 121 THRU 180 | MIDDLE |
| 21 THRU 40 | 8 THRU 11 | OCCURRING WITHIN 181 THRU 240 | LOW |
| 20 OR LESS | 7 OR LESS | NOT OCCURRING UNTIL 241 | NO PROBLEM |

Specifically, the "CPU usage rate" is classified into ranges of 81 thru 100% corresponding to the load information of "extremely high", 61 thru 80% corresponding to the load information of "high", 41 thru 60% corresponding to the load information of "middle", 21 thru 40% corresponding to the load information of "low", and 20% or less corresponding to the load information of "no problem". In a similar manner, the "trap receiving state" is classified into ranges of 20 or more traps per sec corresponding to the load information of "extremely high", 19 thru 16 traps per sec corresponding to the load information of "high", 15 thru 12 traps per sec corresponding to the load information of "middle", 11 thru 8 traps per sec corresponding to the load information of "low", and 7 or less traps per sec corresponding to the load information of "no problem".

In a similar manner, the "load event occurring time" is classified into ranges of occurring within 60 seconds corresponding to the load event occurring time of "extremely high", occurring within 61 thru 120 seconds corresponding to the load information of "high", occurring within 121 thru 180 seconds corresponding to the load information of "middle", occurring within 181 thru 240 seconds corresponding to the load information of "low", and not occurring on and after 241 seconds corresponding to the load information of "no problem". The classifications illustrated in Table 1 and the numbers in the classification are examples and can be properly changed. It is possible to do the process at a high speed by classifying the values of the parameters using the table and measure the loads, as illustrated in Table 1.

The load information generating unit 102 converts values of the parameters into the load information and generates the load information of the manager from the converted load information. Specifically, the load information generating unit 102 inputs the piece of the load information, which indicates the highest load applied to the manager among the plural pieces of the load information obtained by converting the parameters, to the command generating unit 104 as the load information of the manager.

For example, when the values of the parameters are input such that the "CPU usage rate" is 23%, the "trap receiving state" is 5 traps per sec, and the "load event occurring time" is within 289 seconds, the load information generating unit 102 converts the CPU usage rate into the load information of "low", the "trap receiving state" into the load information of "no problem", and the "load event occurring time" into the load information of "no problem". Further, the load information generating unit 102 inputs the piece of the load information of "low", which indicates the higher load applied to the manager among the plural pieces of the load information of "low", "no problem" and "no problem", obtained by converting the parameters, to a command generating unit 104 as the load information of the manager.

For example, when the values of the parameters are input such that the "CPU usage rate" is 58%, the "trap receiving state" is 17 traps per sec, and the "load event occurring time" is within 190 seconds, the load information generating unit 102 converts the "CPU usage rate" into the load information of "middle", the "trap receiving state" into the load information of "high", and the "load event occurring time" into the load information of "low". Further, the load information generating unit 102 inputs the piece of the load information of "high", which indicates the highest load applied to the manager among the plural pieces of the load information of "middle", "high" and "low", obtained by converting the parameters, to a command generating unit 104 as the load information of the manager.

For example, when the values of the parameters are input such that the "CPU usage rate" is 33%, the "trap receiving state" is 11 traps per sec, and the "load event occurring time" is within 44 seconds, the load information generating unit 102 converts the "CPU usage rate" into the load information of "low", the "trap receiving state" into the load information of "low", and the "load event occurring time" into the load information of "extremely high". Further, the load information generating unit 102 inputs the piece of the load information of "extremely high", which indicates the highest load applied to the manager among the plural pieces of the load information of "low", "low" and "extremely high", obtained by converting the parameters, to a command generating unit 104 as the load information of the manager.

The command generating unit 104 generates a command, i.e. Protocol Data Unit (PDU), including the input load information of the manager. For example, the command generating unit 104 makes a header, for example, an UDP header, issued by the SNMP manager including the input load information of the manager, and sends the load information included in the header. Therefore, the header of the command issued by the SNMP manager 100 includes address information, a source port number on a sending side, a destination port number on a receiving side, command code, data information amount such as a UDP data length, and load information. The command code may be included in a protocol data unit (PDU) data format. For example, the command generating unit 104 issues a gathering command for gathering monitoring information held by the SNMP agent, a control command directed to the SNMP agent, and a health check command for the device, to the SNMP agent. Said differently, the command generating unit 104 makes all commands issued by the SNMP manager 100 itself including the load information of the manager and notifies the load information to the SNMP agent.

The command receiving unit 108 receives a response of the SNMP agent for a command issued by the SNMP manager and a trap transmitted by the SNMP agent. The response of the SNMP agent and the trap include information such as a sequence number and status data, the information is input to the agent information storing unit 110.

The agent information storing unit 110 stores the sequence number of the SNMP agent and the state data of the SNMP agent, which are controlled by the SNMP manager.

The gathering command of the monitoring information held by the SNMP agent is a sequence number acquiring command or a command for processing periodical polling. The gathering command held by this SNMP agent is a command manually issued or a command periodically issued at a predetermined interval.

The control command for the SNMP agent is a control command for controlling a network operation or carrying out any kind of test. Although a frequency of using the control commands is not constantly used, the frequency of using the control commands increases during maintenance.

The health check command of the device is a command for checking all the SNMP agents, which exist in the network, whether the SNMP agents are active. The health check command of the device is a command issued at a shorter issue interval than that of the gathering command of the monitoring information, held by the SNMP agent.

As described, the commands issued by the SNMP agent 100 include a command issued immediately before a load is applied to the SNMP agent in, for example, maintenance or information gathering, specifically like a gathering command of monitoring information held by the SNMP agent and a control command, and a command issued at an extremely short interval, specifically like a health check command.

By including the load information of the manager in the command and sending the command, it becomes possible to constantly notify the newest load information to the SNMP agent. The SNMP agent 200 may constantly recognize a load status of the SNMP manager 100. The SNMP agent 200 controls an issue of a trap in response to the load information of the manager, the load information being included in the command sent from the SNMP manager 100. For example, the SNMP agent 200 which had received the command extracts the load information of the manager included in the header of the command, and stores the load information inside the SNMP agent. The SNMP agent 200 carries out the storing process every time the SNMP agent 200 receives the commands and updates the load information of the manager, the load information being stored inside the SNMP agent.

Figure 10:
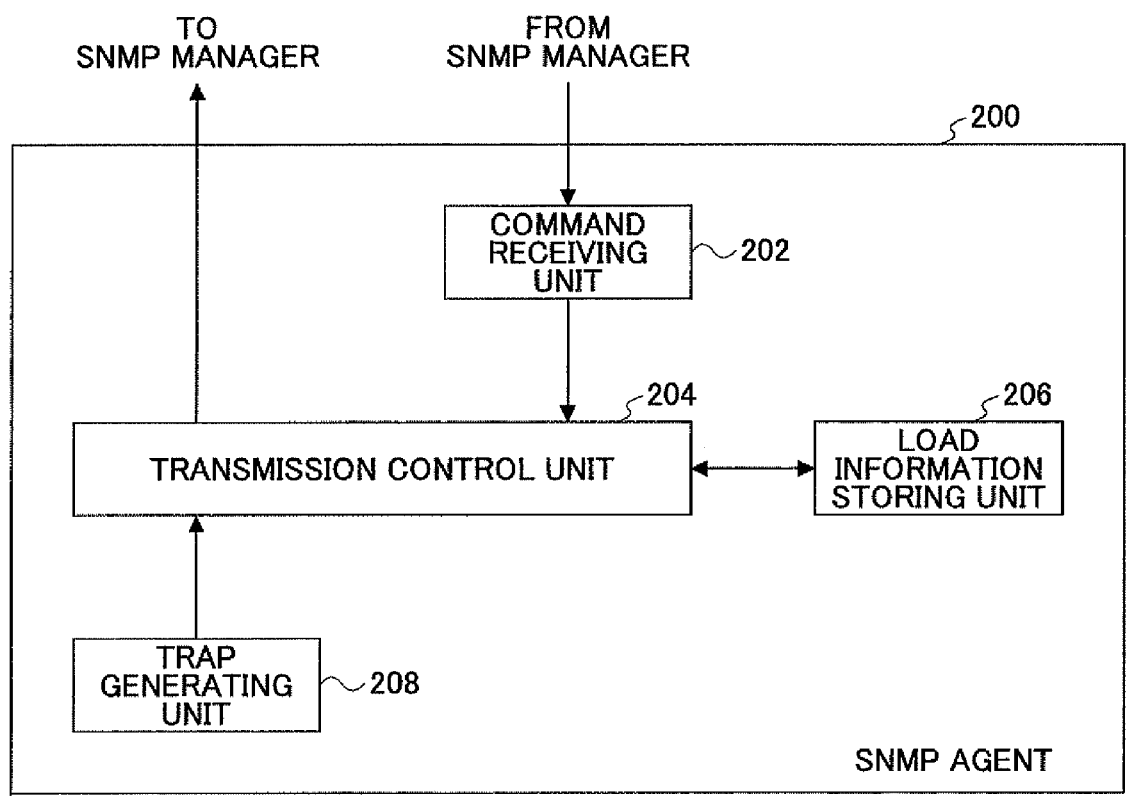
FIG. 10 is a block diagram illustrating an SNMP agent of Embodiment 1.

Next, the SNMP manager 200 of Embodiment 1 is described in reference to FIG. 10.

The SNMP agent 200 of Embodiment 1 includes a command receiving unit 202, a transmission control unit 204, a load information storing unit 206, and a trap generating unit 208.

The command receiving unit 202 carries out a receiving process of the command sent from the SNMP manager 100 and inputs the received command to the transmission control unit 204.

The transmission control unit 204 extracts the load information of the manager included in the header of the input command and inputs the extracted load information to the load information storing unit 206.

The load information storing unit 206 stores the load information of the manager thus input.

When the state of the SNMP agent varies, the trap generating unit 208 generates a command as a state variation notifying command for notifying the state variation, for example, a trap and inputs the state variation notifying command to the transmission control unit 204.

When the trap is input from the trap generating unit 208, the transmission control unit 204 transmits the trap based on the load information stored in the load information storing unit 206. For example, the trap stored in the load information storing unit 206 is transmitted when the load information stored in the load information storing unit 206 is "low" or "no problem". Said differently, when the load information stored in the load information storing unit 206 is "middle", "high" or "extremely high", the trap is not transmitted.

Figure 11:
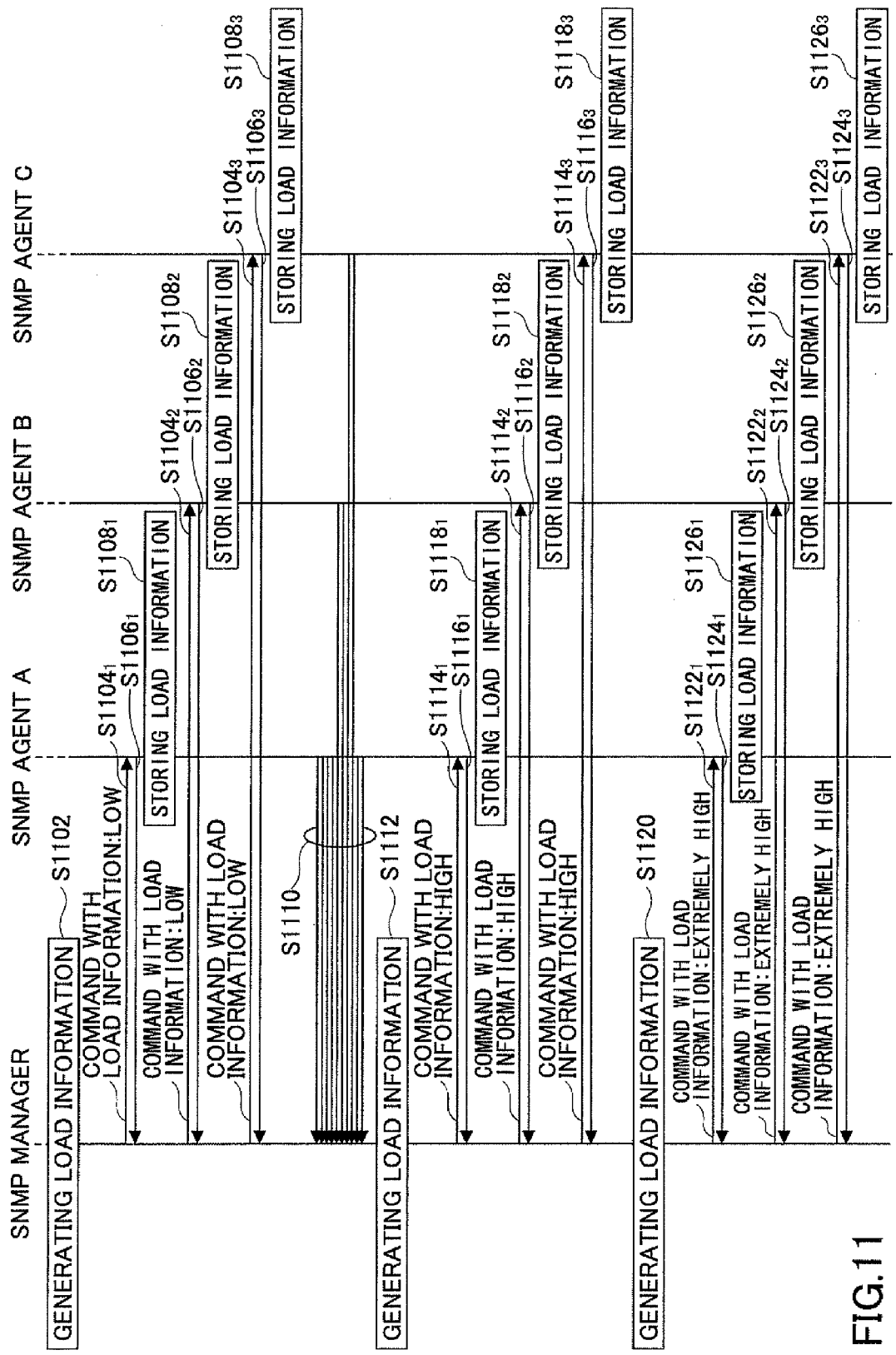
FIG. 11 is a block diagram illustrating an operation of a system of Embodiment 1.

Next, an operation of a device control system of Embodiment 1 is described in reference to FIG. 11.

In Embodiment 1, an explanation is given on a premise that three SNMP agents A, B and C, controlled by the SNMP manager 100, are used. However, the case is also applicable to cases where the number of the SNMP agents is two or four or more. Further, there is described a case where the SNMP manager 100 periodically sends a gathering command for the monitoring information, a control command and a health check command to the SNMP agents 200. However, Embodiment 1 may also be applicable to a case where the gathering command for the monitoring information, the control command and the health check command are irregularly sent.

The SNMP manager 100 generates the load information of the manager based on the CPU usage rate, a trap receiving state, and a load event occurring time in the load information generating unit 102 in step S1102. For example, the load information generating unit 102 generates the load information of "low".

The SNMP manager 100 generates the command in the command generating unit 104, adds the load information of "low" to the header of the command, and sends the command in steps $S1104_1$, $S1104_2$, and $S1104_3$. For example, the command generating unit 104 generates the gathering command of the monitoring information including the load information of "low" inside the header and sends the gathering command to the agents A, B and C.

The agents A, B and C send the monitoring information held by the agents A, B and C to the SNMP manager 100 in steps $S1106_1$, $S1106_2$, and $S1106_3$. The transmission control unit 204 stores the load information of the manager, held in the header of the monitoring information, in the load information storing unit 206 in steps $S1108_1$, $S1108_2$, and $S1108_3$.

The trap generating units 208 of the agents generate traps when states of the agents themselves vary, and input the traps to the transmission control units 204. When the trap is input from the trap generating unit 208, the transmission control unit 204 transmits the trap based on the load information, stored in the load information storing unit 206, of the manager. Because the load information of the manager stored in the load information storing unit 206 is "low", the trap is transmitted in step S1110.

The SNMP manager 100 receives the trap transmitted from the SNMP agents A, B and C. As a result, the CPU usage rate and the trap receiving state increase.

The SNMP manager 100 generates the load information of the manager based on the "CPU usage rate", the "trap receiving state", and the "load event occurring time" in the load information generating unit 102 in step S1112. In the situation, since the CPU usage rate and the trap receiving state increase, the load information of the manager is high.

The SNMP manager 100 generates a command in the command generating unit 104, adds the load information of "high" to the header of the command, and sends the command in steps $S1114_1$, $S1114_2$, and $S1114_3$. For example, the command generating unit 104 generates the control command including the load information of "high" inside the header and sends the control command to the agents A, B and C.

The SNMP agents A, B and C send responses to the received control command to the SNMP manager 100 in steps $S1116_1$, $S1116_2$, and $S1116_3$. The transmission control unit 204 stores the load information, held in the header of the control command, in the load information storing unit 206 in steps $S1118_1$, $S1118_2$, and $S1118_3$. As a result, the load information of the manager is updated with "high".

The trap generating units 208 of the agents generate traps when states of the agents themselves vary, and input the traps to the transmission control units 204. When the trap is input from the trap generating unit 208, the transmission control unit 204 transmits the trap based on the load information, stored in the load information storing unit 206, of the manager. Because the load information of the manager stored in the load information storing unit 206 is "high", the trap is not transmitted. The SNMP agent transmits the trap when probability of receiving the trap is determined to be high such that the load information is "low" or "no problem".

After some time, the load becomes low.

The SNMP manager 100 generates the load information of the manager based on the CPU usage rate, the trap receiving state, and the load event occurring time in the load information generating unit 102 in step S1120. For example, the load information generating unit 102 receives information including an issuance of the information gathering command causing the high load occurs within a minute, as the load event occurring time. At this time, the load information of the manager becomes "extremely high".

The SNMP manager 100 generates a command in the command generating unit 104, adds the load information of "extremely high" to the header of the command, and sends the command in steps $S1122_1$, $S1122_2$, and $S1122_3$. For example, the command generating unit 104 generates the control command including the load information of "extremely high" inside the header and sends the control command to the agents A, B and C.

The SNMP agents A, B and C send responses to the received health check commands to the SNMP manager 100 in steps $S1124_1$, $S1124_2$, and $S1124_3$. The transmission control unit 204 stores the load information of the manager, held in the header of the health check command, in the load information storing unit 206 in steps $S1126_1$, $S1126_2$, and $S1126_3$. As a result, the load information of the manager is updated with "extremely high".

The trap generating units 208 of the agents generate traps when states of the agents themselves vary, and input the traps to the transmission control units 204. When the trap is input from the trap generating unit 208, the transmission control unit 204 transmits the trap based on the load information, stored in the load information storing unit 206, of the manager. Because the load information of the manager stored in the load information storing unit 206 is "extremely high", the trap is not transmitted. The SNMP agent transmits the trap when probability of receiving the trap is determined to be high such that the load information is "low" or "no problem".

With Embodiment 1, a trap transmitting process may be controlled by an SNMP agent based on load information of an SNMP manager when the load information is notified to the SNMP agent. Therefore, a failure of trap receipt in the SNMP manager is decreased.

Embodiment 2

Next, a device control system of Embodiment 2 is described.

In the device control system of Embodiment 2, an SNMP agent controls a trap issuance using notified load information of a manager. Further, the SNMP agent carries out at least one of a trap transmitting delay process and a DB storing process in reference to an operation determining table, to be described below, in response to a load status of the SNMP manager. When the DB storing process is selected, after reducing the load of the SNMP manager 100, the SNMP manager issues an inner-DB referring command to the SNMP agent and acquires state information inside the DB. Thus, the SNMP manager 100 recovers the state information. After the SNMP manager acquires the state information, the SNMP agent deletes all state information, stored in the DB inside the SNMP agent. In this way, a DB provided in an SNMP agent is prevented from being depleted.

A structure of the device control system is similar to the structure described in reference to FIG. 7.

Figure 12:
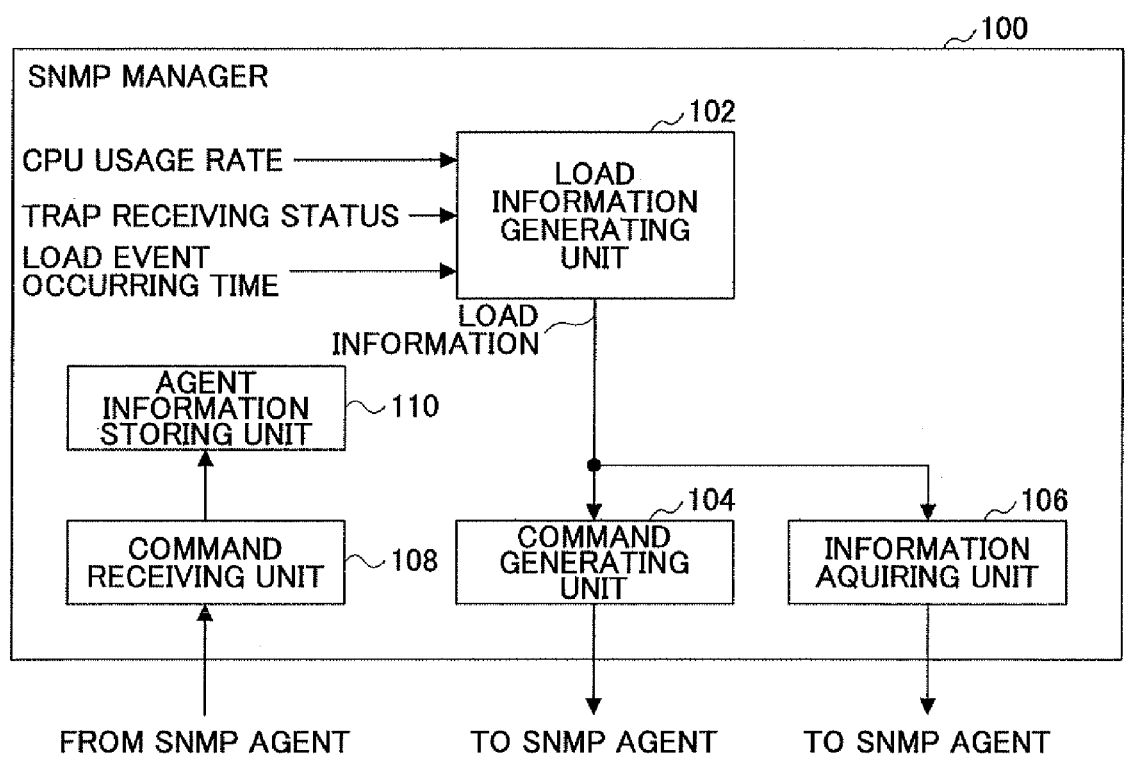
FIG. 12 is a block diagram illustrating an example of an SNMP manager of Embodiment 2.

The SNMP manager 100 of Embodiment 2 is described in reference to FIG. 12. The SNMP manager 100 of Embodiment 2 further includes a load information generating unit 102 and an information acquiring unit 106 in addition to the structure of the SNMP manager described in Embodiment 1 with reference to FIG. 8.

The information acquiring unit 106 carries out of traps, which had been failed to be received, based on load information, input from the load information generating unit 102, of a manager when the load information of the manager is "low" or "no problem". Specifically, when load information of the manager changes from "extremely high", "high" or "middle" to "low" or "no problem", a trap which had been transmitted from an SNMP agent 200, failed to be received by an SNMP manager 100, and a lost trap is recovered. For example, the information acquiring unit 106 sends an inner-DB state sending request command for requesting state information inside the DB to the SNMP agent. The SNMP manager 100 does not detect loss or shortage of traps. Therefore, the SNMP manager 100 issues an inner-DB state sending request command for acquiring state information stored in the SNMP agent 200. The inner-DB state sending request command is provided with a sequence number stored in the SNMP manager 100. Thus, it is enabled for the SNMP manager 100 to inquire the SNMP agent 200 of whether there is a state variation on and after the provided sequence number.

Figure 13:
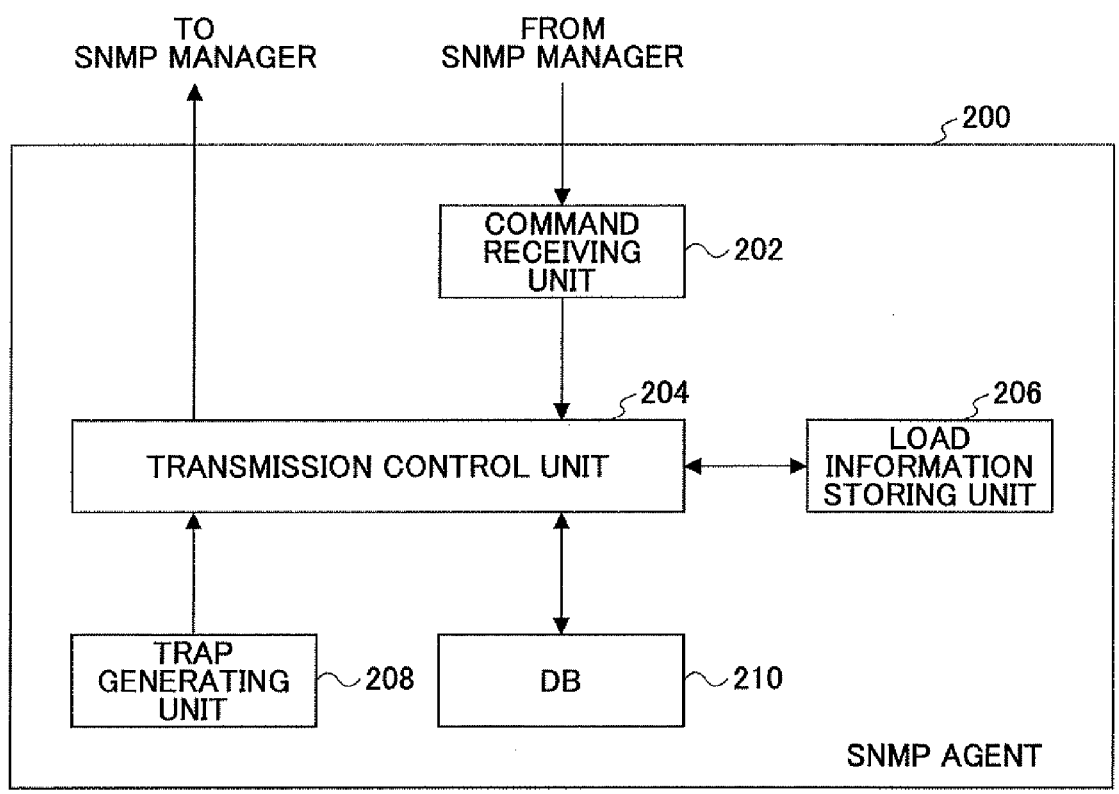
FIG. 13 is a block diagram illustrating an SNMP agent of Embodiment 2.

A structure of an SNMP agent of Embodiment 2 is described in reference to FIG. 13. The SNMP agent includes a database (DB) 210 as a storing means of a state variation notifying command, which is connected to a transmission control unit 204, in addition to the structure of the SNMP agent described in Embodiment 1 with reference to FIG. 10.

The transmission control unit 204 carries out at least one of a trap issuing process and a trap storing process based on the load information stored in the load information storing unit 206 when a chance of issuing a trap occurs. For example, the transmission control unit 204 refers to a table indicating operation of an SNMP agent for a load of an SNMP manager as illustrated in Table 2. When load information of the SNMP manager is "extremely high", a trap transmission is stopped and stored in a DB 210. When the load information of the SNMP manager is "high", the trap is intermittently transmitted, for example, at an interval of several seconds, and stored in the DB 210. When the load information of the SNMP manager is "middle", the trap is transmitted and stored in the DB 210. When the load information of the SNMP manager is "low", the trap is transmitted and is not stored in the DB 210. When the load information of the SNMP manager is "no problem", the trap is transmitted and is not stored in the DB 210.

TABLE 2

TABLE ILLUSTRATING AGENT'S OPERATION IN RELATION TO LOAD INFORMATION OF MANAGER

| LOAD INFORMATION OF MANAGER | AGENT'S OPERATION | |
|---|---|---|
| | ISSUANCE OF TRAP | STORING DB DATA |
| EXTREMELY HIGH | STOP TO TRANSMIT TRAP | EXECUTION OF STORE |
| HIGH | INTERMITTENTLY TRANSMIT | |
| MIDDLE | TRANSMIT | |
| LOW | | NOT STORE |
| NO PROBLEM | | |

When the load information of the manager is "no problem" or "low", it is assumed that a problem does not occur, thereby the trap is transmitted without taking a specific measure. In this case, a data storing process for storing data in the DB 210 is not carried out in a trap. When the load information of the manager is "middle", there may occur a failure of trap receipt depending on the situation. For this purpose, the trap is ordinarily received and further the data are stored in the DB 210. When the load information of the SNMP manager is "high", since probability of causing the failure of trap receipt is higher than a case where the load information is "middle", the data are stored in the DB 210 and the traps are intermittently transmitted, in other words, an amount of transmitting the traps is controlled. For example, an interval of transmitting the traps is extended by several milliseconds in comparison with an ordinary situation. Thus, the SNMP manager can receive the traps. When the load information of the SNMP manager is "extremely high", since the probability of the failure of trap receipt is high, the traps are prevented from being issued and the data are stored in the DB 210.

Further, the transmission control unit 204 notifies state information indicative of a state variation occurring on and after a notified sequence number when the transmission control unit 204 receives an inner-DB state sending request command from the SNMP manager 100. Then, the transmission control unit 204 deletes the state information indicative of the notified state variation from the DB 210. Thus, the SNMP manager 100 can recover lost information, and the SNMP agent can reduce the capacity of the DB and prevent from depleting the DB.

Next, an operation of a device control system of Embodiment 2 is described in reference to FIG. 14.

In Embodiment 2, an explanation is given on a premise that three SNMP agents A, B, and C, controlled by the SNMP manager 100, are used. However, the case is also applicable to cases where the number of the SNMP agents is two, or four or more.

Referring to FIG. 14, the load status of the SNMP manager changes from "low" to "high".

The load information generating unit 102 generates the load information in step S1402. For example, the load information generating unit 102 generates the load information of "high".

When a state of at least any one of the SNMP agents A, B and C themselves varies before a command is sent from the SNMP manager 100, a trap generating unit 208 of the SNMP agent generates a trap and inputs the trap to a transmission control unit 204. When the trap is input from the trap generating unit 208, the transmission control unit 204 transmits the trap based on the load information, stored in the load information storing unit 206, of the manager. Because the load information of the manager stored in the load information storing unit 206 is "low", the trap is transmitted in step S1404. As a result, because the SNMP manager 100 continuously receives traps, the load on the SNMP manager 100 further increases.

Further, traps are transmitted by the SNMP agents A, B and C in step S1406. As a result, the SNMP manager 100 may fail to receive the traps in step S1408.

After some time, the load status of the SNMP manager 100 changes from "high" to "low". The load information generating unit 102 generates the load information of the SNMP manager 100 in step S1410. For example, the load information generating unit 102 generates the load information of "low".

The information acquiring unit 106 sends an inner-DB state sending request to the SNMP agents A, B and C since the load information, which is generated by the load information generating unit 102, is changed to "low" in steps S1412$_1$, S1412$_2$, and S1412$_3$. The inner-DB state sending requests have sequence numbers for the SNMP agents.

When the SNMP agents A, B and C receive the inner-DB state sending request from the SNMP manager, the SNMP agents A, B and C transmit, based on a sequence number included in the inner-DB state sending request, state data corresponding to the sequence number or later in steps S1414$_1$, S1414$_2$ and S1414$_3$. Thereafter, the transmission control units 204 of the SNMP agents A, B and C delete the transmitted state data from the DB 210 in steps S1416$_1$, S1416$_2$ and S1416$_3$.

With Embodiment 2, the SNMP agent 200 can carry out at least one of a sending process of transmitting traps and a storing process of storing traps based on the load information of the SNMP manager 100.

Heretofore, SNMP agents do not control a trap issuing process. The SNMP agents carry out a process of storing traps or a process of transmitting a trap corresponding to a sequence number, which is used for inquiring the trap by an SNMP manager.

With Embodiment 2, a process of storing in the DB is carried out. However, if all the state information or the like is stored in the DB, the capacity of the DB may be depleted or become insufficient. Therefore, the state information or the like may be stored for a certain period of time. Specifically, when the load information of the SNMP manager is "low" or "no problem", a DB information sending request command including a sequence number is issued from the SNMP manager 100 to the SNMP agent 200. The DB information sending request command enables the SNMP manager 100 to inquire a state variation occurring on and after the sequence number. The SNMP agent 200 sends state information corresponding to the sequence number, included in the DB information sending request command, or later, and thereafter deletes the sent state information from the DB. In this way, the DB provided in the SNMP agent 200 can be designed to have a smaller capacity. Further, the SNMP manager can recover the state information to thereby enable to establish an SNMP communication without failures of trap receipts.

Next, improvement effects with Embodiment 2 are described.

As an example in a case of continuing similar load states for six hundreds (600) seconds, a change of the numbers of failing to receive traps in a background technique is explained.

Table 3 illustrates a load status, which is generated upon congestion occurring with traps transmitted from SNMP agents.

TABLE 3

NUMBER OF FAILING TO RECEIVE TRAP (1)

| LOAD STATUS | RATE OF TRAP (TRAP/sec) | BACKGROUND TECHNIQUE (TRAP) | EMBODIMENT (TRAP) |
|---|---|---|---|
| NO PROBLEM | 6 | 0 | 0 |
| LOW | 10 | 0 | 0 |
| MIDDLE | 14 | 1 | 0 |
| HIGH | 18 | 2 | 1*1 |
| EXTREMELY HIGH | 20 | 5 | 1*1 |

Since the similar load states continue for six hundred (600) seconds, the higher the load is, said differently, i.e. the higher a rate of traps is, the more the number of failing to receive traps is in various load states of a background technique. Meanwhile, when a technique of Embodiment 2 is introduced, there is probability of failing to receive a trap only immediately after the load state is generated. However, the failure of trap receipt does not occur in other time periods. In Table 3, a mark "*1" designates existence of probability of failing to receive the trap only immediately after the load state occurs.

Next, there is described a case where the load state occurs upon information-gathering, which is registered so as to be carried out depending on a schedule.

TABLE 4

NUMBER OF FAILING TO RECEIVE TRAP (2)

| LOAD STATUS | RATE OF TRAP (TRAP/sec) | BACKGROUND TECHNIQUE (TRAP) | EMBODIMENT (TRAP) |
|---|---|---|---|
| NO PROBLEM | 6 | 0 | 0 |
| LOW | 10 | 0 | 0 |
| MIDDLE | 14 | 1 | 0 |
| HIGH | 18 | 2 | 0 |
| EXTREMELY HIGH | 20 | 5 | 0 |

An SNMP manager sends an information-gathering command and can anticipate an amount of responses. Because a process of response is not known nor controlled in the background technique, a failure of trap receipt may occur in a manner similar to a case where the load state occurs upon congestion, which is caused by traps from SNMP agents as described above. On the other hand, when the technique of Embodiment 2 is introduced, since it is possible to intermittently transmit or stop to transmit the traps, there occurs no failure of trap receipt.

Table 5 illustrates a relationship between a rate of traps received by an SNMP manager per a second and a maximum information amount necessary to recover after reducing a load. In Table 5, one trap has fifty (50) bytes.

TABLE 5

MAXIMUM INFORMATION AMOUNT REQUIRED TO RECOVER INFORMATION AFTER REDUCING LOAD

| LOAD STATUS | RATE OF TRAP (TRAP/sec) | DATA AMOUNT (MegaByte) | | |
|---|---|---|---|---|
| | | TEN MINUTES | ONE HOUR | ONE DAY |
| NO PROBLEM | 6 | 0.18 | 1.08 | 25.92 |
| LOW | 10 | 0.3 | 1.8 | 43.2 |
| MIDDLE | 14 | 0.42 | 2.52 | 60.48 |
| HIGH | 18 | 0.54 | 3.24 | 77.76 |
| EXTREMELY HIGH | 20 | 0.6 | 3.6 | 86.4 |

When the technique of Embodiment 2 is introduced, even though a load state of "extremely high" continues one day and thereafter the load is decreased, it is possible to prevent a failure of trap receipt by recovering information of 86.4 MB (Megabytes).

With Embodiments 1 and 2, it is possible to provide a manager, an agent, a system and a transmission control method in the system communicable between the manager and the agent based on a load state of the manager.

With Embodiments 1 and 2, it is possible to provide a manager, an agent, a system, and a transmission control method which enables to decrease a failure of trap receipt in the manager based on a load status of the manager.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A manager controlling an agent connected to the manager via a network using a simple network management protocol, the manager comprising:
    a load information generating unit that generates manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager; and
    a command generating unit that generates a control command to be sent to the agent,
    wherein the command generating unit generates the control command, to which the manager load information is added, and the agent controls transmission of the state variation notifying command based on the manager load information added to the control command.

2. The manager according to claim 1,
    wherein the CPU usage rate and the state variation notifying command are classified into plural ranges depending on a load of the manager, the load event occurring time is classified into plural time ranges, and the load information generating unit generates the manager load information indicative of either a highest load applied to the manager or a shortest time load event occurring time based on the classified plural ranges and plural time ranges.

3. The manager according to claim 1,
    wherein the command generating unit adds manager load information to headers of all commands to be sent to the agent.

4. An agent connected to a manager via a network and controlled by the manager, which sends manager load information indicative of a load status of the manager added to a control command along with the command, the agent comprising:
    a load information storing unit that stores the manager load information added to the control command; and
    a transmission control unit that controls transmission of a state variation notifying command of notifying the manager of a state variation based on the manager load information stored in the load information storing unit when a state of the agent varies.

5. The agent according to claim 4, further comprising:
    a state variation notifying command storing unit that stores the state variation notifying command,
    wherein the transmission control unit carries out at least one of a transmission process of transmitting the state variation notifying command and a storing process of storing the state variation notifying command based on the manager load information stored in the load information storing unit.

6. A system including an agent connected to a network, a manager connected to the network and controlling the agent using a simple network management protocol,
    wherein the manager comprises:
    a load information generating unit that generates manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager; and
    a command generating unit that generates a control command, to which the manager load information is added, and sends the control command to the agent, and
    the agent comprises:
    a load information storing unit that stores the manager load information added to the control command; and
    a transmission control unit that controls transmission of the state variation notifying commands based on the manager load information stored in the load information storing unit.

7. A transmission control method in a system including an agent connected to a network, a manager connected to the network and controlling the agent using a simple network management protocol, the transmission control method comprising:

generating, with the manager, manager load information indicative of a load status of the manager based on a CPU usage rate indicative of a load status of a CPU installed in the manager, a receiving state of a state variation notifying command indicative of the number of receiving state variation notifying commands, transmitted by the agent to notify the manager of a state variation inside a device in which the agent is installed, and a load event occurring time indicative of a time period before a periodic process is periodically carried out by the manager;

generating, with the manager, a control command to which the manager load information is added;

sending, with the manager, the generated control command;

receiving, with the agent, the sent control command; and controlling, with the agent, to transmit the state variation notifying commands based on the manager load information added to the control command.

* * * * *